(12) United States Patent
Engelbrecht et al.

(10) Patent No.: US 7,572,846 B2
(45) Date of Patent: Aug. 11, 2009

(54) VESICULATED POLYMER PARTICLES

(75) Inventors: John Francis Engelbrecht, Krugersdorp (ZA); Deon De Wet-Roos, Krugersdorp (ZA); Albertus Christiaan Smit, Krugersdorp (ZA); Boyd Cooray, Krugersdorp (ZA)

(73) Assignee: Freeworld Coatings Capital, Paulshof (ZA)

( * ) Notice: Subject to any disclaimer, the term of this patent is extended or adjusted under 35 U.S.C. 154(b) by 607 days.

(21) Appl. No.: 10/529,764

(22) PCT Filed: Sep. 23, 2003

(86) PCT No.: PCT/ZA03/00140

§ 371 (c)(1),
(2), (4) Date: Oct. 3, 2005

(87) PCT Pub. No.: WO2004/029116

PCT Pub. Date: Apr. 8, 2004

(65) Prior Publication Data

US 2006/0111474 A1    May 25, 2006

(30) Foreign Application Priority Data

Sep. 30, 2002    (ZA) .................................. 02/7813

(51) Int. Cl.
*C08J 9/32* (2006.01)
(52) U.S. Cl. ...................................................... 523/218
(58) Field of Classification Search .................. 523/218
See application file for complete search history.

(56) References Cited

U.S. PATENT DOCUMENTS 4,321,332 A * 3/1982 Beresford et al. ........... 523/502
5,972,809 A    10/1999 Martin et al.

FOREIGN PATENT DOCUMENTS

| EP | 0 307 139 | 3/1989 |
| EP | 0 622 402 | 11/1994 |
| WO | WO 81 01711 | 6/1981 |

* cited by examiner

*Primary Examiner*—Edward J Cain
(74) *Attorney, Agent, or Firm*—Young & Thompson

(57) ABSTRACT

Vesiculated polymer particles and a method of manufacture thereof, are suitable for the beneficial replacement of titanium dioxide pigments and extenders amongst others, and have improved opacity, whiteness, scrub resistance and water resistance due. The manufacturing process exhibits effective control of particle size and particle size distribution.

22 Claims, No Drawings

VESICULATED POLYMER PARTICLES

TECHNICAL FIELD OF THE INVENTION

This invention relates to vesiculated polymer particles and a method of manufacture thereof, with particular relevance to their use in coating compositions.

BACKGROUND ART

The morphology of cross-linked multi-vesiculated polyester particles described in prior art consist of largely spherical hollow particles with multiple air voids in the dry state. These particles re-absorb water in paints and coatings, are difficult to manufacture and their particle size control is limited to processing variables such as temperature, speed of agitation and process time.

Prior art patent WO 81/01711 for the production of vesiculated beads. In this process, a first emulsion (EMI) is formed in which an aqueous phase having pigment dispersed therein is emulsified in a mixture of an unsaturated polyester and a co-polymerisable monomer as a solution of the polyester in the monomer. This is a water-in-oil-emulsion. EMI is then emulsified at high shear into an aqueous phase to form a water-in-oil-in-water emulsion having the oil phase as globules of polyester/monomer each containing a number of vesicles of the initial aqueous phase. A polymerising initiator is added to initiate crosslinking of the polyester under curing conditions to form the desired vesiculated beads. Shorter chain monomers (C12 and less) which have minimal hydrophobicity, are used.

It is an object of this invention to provide cross-linked polyester particles whose morphology is largely spherical with multiple air voids that hinder the re-entry and re-absorption of water when the cross-linked particles are dry.

It is a further object of the invention to provide a conversion process of the raw materials composition which permits cross-linked particle size and distribution control through process variables such as temperature, rate of agitation and processing time as well through the concentration of modifying co-monomer in the raw material composition and the optimization of the process stage for adding this co-monomer to the said composition.

It is yet a further object of this invention to provide a vesiculated polymer particle which may be used in paint and coatings formulations for the beneficial replacement of titanium dioxide pigments, expensive extenders, emulsion polymers, open time modifiers such as glycols and humectants with simultaneous achievement of improved opacity, whiteness, scrub resistance, water resistance and special faux finish effects.

DISCLOSURE OF THE INVENTION

According to the invention, vesiculated polymer particles include particulate solids and have associated with the surfaces thereof, long chain aliphatic chemical groups and/or sterically hindered, branched chained chemical groups.

In the one form of the invention, the chemical groups are hydrophobic and comprise organic compounds with at least one polymerisable carbon-carbon double bond with linear, branched or cyclic moeities having at least fourteen but not more than twenty five carbon atoms, including but not limited to:

Octadecene; Lauryl methacrylate; Acrylated castor oil; Acrylated ricinoleic acid; Methacrylated ricinoleic acid; Soya Bean Oil; Unsaturated fatty acids, e.g. Oleic acid, tallow fatty acid; Unsaturated fatty alcohols, e.g. Oleyl alcohol, pentadeca-12-ene-1-ol.; Oleamide; Triglycerides, e.g. tall oil, ting oil; Ethylenic unsaturated urethanes; Acrylic unsaturated urethanes; Air drying short oil alkyds; Alkyl and Aryl Esters of maleic anhydride, singly or in combination.

These monomers are substantially more hydrophobic that typical monomers used in the prior art, for example methyl methacrylate, ethyl acrylate, acrylonitrile and vinyl toluene.

In this description, the term associated may refer to groups included in the polymer particles or applied to the surface or portions of the surface thereof.

According to a second aspect of the invention, a raw material composition for manufacture of vesiculated particles includes a carboxylic acid functional, free-radical polymerizable polyester resin, a co-reactive diluent monomer and a modifying comonomer, the modifying co-monomer including at least one polymerisable carbon-carbon double bond with linear, branched or cyclic moeities having at least fourteen but not fewer than twenty five carbon atoms, including but not limited to:

Lauryl methacrylate; Acrylated castor oil; Acrylated ricinoleic acid; Methacrylated ricinoleic acid; Soya Bean Oil; Unsaturated fatty acids, e.g. Oleic acid, tallow fatty acid; Unsaturated fatty alcohols, e.g. Oleyl alcohol, pentadeca-12-ene-1-ol.; Oleamide; Triglycerides, e.g. tall oil, ting oil; Ethylenic unsaturated urethanes; Acrylic unsaturated urethanes; Air drying short oil alkyds; Alkyl and Aryl Esters of maleic anhydride, singly or in combination.

The modifying co-monomer may comprise between 3 and 20% by mass of the added or reactive diluent monomer, and preferably comprises between 5 and 9% by mass of the added diluent monomer. This excludes the diluent monomer present in the polyester resin.

Suitable diluent co-monomers comprise ethylenic, acrylic and methacrylic functional monomers for example styrene, butyl acrylate, methyl methacrylate and preferably styrene.

In one form, the polyester resin composition comprises:

| | |
|---|---|
| Propylene glycol | 30.35% |
| Phthalic anhydride | 12.96% |
| Maleic anhydride | 25.75% |
| Styrene | 30.75% |
| Inhibitor (10% solution) | 0.18% |
| TOTAL | 100.00 |

According to a third aspect of the invention, a method of manufacture of the vesiculated particles includes the steps of
 pre-dispersing pigment particles in a polyester;
 dissolving the pre-dispersed pigment-polyester in a suitable monomer in the presence of a water-soluble base;
 forming a stable emulsion of droplets of solution of the pre-dispersed pigment-polyester and monomer (oil phase) in water;
 adding a hydrophobic monomer
 and polymerising the polyester and co-polymerisable monomer thereby producing granules of opaque, cross-linked vesiculated particles as a dispersion in water, the particles including hydrophobic groups associated with their surfaces.

The delayed addition of the hydrophobic (modifying) monomer at a point when a stable emulsion has been formed, results in maintenance of the particle size of vesiculated particles produced as a result of the mixing during emulsification.

In one form, the base may comprise a polyamine, for example diethylenetriamine.

Particles of various sizes may be manufactured using different mixers with different mixing intensity when emulsifying the polyester in water. In one form of the invention, suitably designed equipment controlling pressure, temperature, and residence time, for example homogenisers, may be used. Chemical control of particle size and particle size distribution is also effected by the introduction of long chain aliphats or sterically hindered, branched, chained co-monomers.

As most of these monomers or macro-monomers when incorporated into vesiculated polymer particles coarsen the average particle size, it was found preferable to add it at a later stage during emulsification of the organic phase in the water phase. This minimised the effect on particle size. The coarser particle size versions can however be used to impart special effects in paint e.g. texture.

The modified vesiculated polymer particles when incorporated into paint systems had the effect of improving water resistance, abrasion resistance, whiteness and opacity.

EXAMPLES

The following examples are intended to illustrate the invention, but are not presented as limitations on the scope of the invention.

Example 1

The following vesiculated polymer particles were synthesized as per prior art.

|  | Parts by Weight |
| --- | --- |
| Stage 1 | |
| Polyester | 14.99 |
| Titanium Dioxide | 0.86 |
| Styrene | 6.54 |
| Diethylene Triamine | 0.21 |
| Stage 2 | |
| Polyvinyl alcohol solution (10%) | 13.28 |
| Hydroxy Ethyl cellulose solution (2.5%) | 10.45 |
| Water | 52.92 |
| Diethylene Triamene | 0.06 |
| Stage 3 | |
| Water | 0.21 |
| Ferrous Sulphate | 0.01 |
| Cumene Hydroperoxide | 0.12 |
| Stage 4 | |
| Bacteriacide | 0.35 |
| | 100.00 |

Procedure

1. The Titanium Dioxide is dispersed in the polyester at high speed in a high shear mixture.
2. Styrene and Diethylene Triamine is added to 1) above at low speed.
3. Stage 2 is prepared in a separate vessel at low speed.
4. Stage 1 (organic phase) is added to Stage 2 at high speed on a high shear mixture and stirred until the desired particle size of the organic phase is obtained.
5. Stage 3 is then added at low shear by firstly pre-mixing the Ferrous Sulphate and water and then added. This is followed by adding the Cumene Hydroperoxide.
6. The stirrer is stopped and the product is left undisturbed to cure overnight.
7. The vesiculated particles are then stirred until homogenous and a suitable bacteriacide is added.

A fluid white dispersion of cross-linked polymer particles is obtained in water which on drying forms non-film forming particles with multiple air voids present.

Average particle size will vary depending on the stirring intensity used when adding Stage 1 to Stage 2.

Example 2

As per Example 1 but 0.1% of the Styrene was replaced with Lauryl Methacrylate. Stirring conditions as per Example 1.

Example 3

As per Example 1 but 3% of the Styrene was replaced with Lauryl Methacrylate. Stirring conditions as per Example 1.

Example 4

As per Example 1 but 5% of the Styrene was replaced with Lauryl Methacrylate. Stirring conditions as per Example 1.

Example 5

As per Example 1 but 7% of the Styrene was replaced with Lauryl Methacrylate. Stirring conditions as per Example 1.

Example 6

As per Example 1 but 9% of the Styrene was replaced with Lauryl Methacrylate. Stirring conditions as per Example 1.

Example 7

As per Example 1 but 20% of the Styrene was replaced with Lauryl Methacrylate. Stirring conditions as per Example 1.

Example 8

The vesiculated particles produced in the above examples 1 to 7 were measured for the following properties:

1. Total solids content using a Mettler HR73 halogen moisture analyzer.
2. Viscosity using a Brookfield LVT viscometer.
3. pH using a Metrohm 744 pH meter.
4. Specific gravity using a Sheen 100 cc "weight per gallon" cup.
5. Opacity using Leneta form 2 A opacity charts and Sheen micropac reflectometer.
6. Whiteness using BYK-Gardner color-view spectrophotometer.
7. Average particle size using a scanning electron microscope (Topcon & Scion image analysis software).

Results as follows:

Vesiculated Particles Manufactured on Variable Shear Cowles Mixer

| LMA % | Solids, % | Viscosity, cps | pH | S.G. | Opacity | Whiteness | Average Particle Size, microns |
|---|---|---|---|---|---|---|---|
| 0 | 23.50 | 800 | 6.78 | 1.043 | 0.93 | 94.0 | 5.6 |
| 0.1 | 23.80 | 610 | 6.66 | 1.044 | 0.96 | 96.7 | 6.1 |
| 3 | 23.90 | 1200 | 6.50 | 1.044 | 0.96 | 96.1 | 6.9 |
| 5 | 23.63 | 1250 | 6.55 | 1.046 | 0.95 | 96.4 | 7.5 |
| 7 | 23.7 | 3720 | 6.74 | 1.042 | 0.96 | 97.0 | 8.3 |
| 9 | 23.46 | 3900 | 6.75 | 1.044 | 0.95 | 95.4 | 16.0 |
| 20 | 23.67 | 14800 | 6.73 | 1.033 | 0.88 | 94.5 | 36.5 |

The improvement in opacity and whiteness is clearly illustrated as well as the effect of increase particle size.

Example 9

The vesiculated polymer particles from Example 1 to 7 were formulated into the following mixture to produce water based emulsion paint:

| RAW MATERIAL | PARTS BY WEIGHT |
|---|---|
| Vesiculated Particles | 77.5 |
| Styrene Acrylic Emulsion Polymer | 9.7 |
| Coalescent | 1.1 |
| Ammonia (Diluted 1:1 with water) | 1 |
| Titanium Dioxide Aqueous Dispersion | 9.7 |
| Thickener | 1 |

The paints obtained by using the vesiculated particles from Examples 1 to 7 in this examples were tested for wet scrub (abrasion) resistance and the following results recorded:

| | |
|---|---|
| 1. Paint using Vesiculated Particles from Example 1 = | 20 cycles |
| 2. Paint using Vesiculated Particles from Example 2 = | 120 cycles |
| 3. Paint using Vesiculated Particles from Example 3 = | 500 cycles |
| 4. Paint using Vesiculated Particles from Example 4 = | 1100 cycles |
| 5. Paint using Vesiculated Particles from Example 5 = | 1500 cycles |
| 6. Paint using Vesiculated Particles from Example 6 = | 900 cycles |
| 7. Paint using Vesiculated Particles from Example 7 = | 600 cycles |

The higher wet scrub cycles indicate better scrub and abrasion resistance in the final paint. The results confirm the improvements in water and scrub resistance obtained by using the compositions of this invention in paints and coatings.

Example 10

Repeat of Example 4 but using Octadecene instead of Lauryl Methacrylate. Stirring conditions as per Example 1.

Example 11

Repeat of Example 4 but using Acrylated Methyl Ricinoleate instead of Lauryl Methacrylate. Stirring conditions as per Example 1.

Example 12

Repeat of Example 4 but using Methacrylated Ricinoleate instead of Lauryl Methacrylate. Stirring conditions as per Example 1.

Example 13

The vesiculated polymer particles from Examples 10, 11 and 12 were measured for properties as above in Example 8.
Results as follows:

Vesiculated Particles Manufactured on Variable Shear Cowles Mixer

| Example | Solids, % | Viscosity, cps | pH | S.G. | Opacity | Whiteness | Average Particle Size, microns |
|---|---|---|---|---|---|---|---|
| 10 | 23.39 | 10000 | 6.56 | 1.045 | 0.95 | 95.0 | 17 |
| 11 | 23.48 | 1800 | 6.72 | 1.043 | 0.96 | 95.4 | 9 |
| 12 | 23.50 | 1900 | 6.47 | 1.045 | 0.96 | 95.2 | 9 |

Example 14

The vesiculated polymer particles from Example 10, 11 and 12 were formulated into water-based paint as per Example 9 and tested for wet scrub (abrasion) resistance.

| | |
|---|---|
| 1. Paint using vesiculated particles from Example 1 = | 20 cycles. |
| 2. Paint using vesiculated particles from Example 10 = | 500 cycles. |
| 3. Paint using vesiculated particles from Example 11 = | 1000 cycles. |
| 4. Paint using vesiculated particles from Example 12 = | 1200 cycles. |

The results confirm the improvements in water and scrub resistance obtained by using the compositions of this invention in paints and coatings.

Example 15

The water resistance and whiteness of paint containing:
Vesiculated particles synthesized using prior art technology (Example 1).
Vesiculated particles synthesized using the present patent technology (Example 4).

were compared. The paint is of medium quality and suitable for both interior and exterior use.

The following are the results obtained.

| Vesiculated Particles from | Paint | |
|---|---|---|
| | A (Example 1) | B (Example 4) |
| Water resistance | | |
| Water droplet method[1] | 5 min | 10 min. |
| Wet abrasion resistance[2] | 1280 cycles | 2198 cycles |
| Colour D10° (against Std)[3] | | |
| L | −0.28 D | −0.51 D |
| A | −0.06 G | −0.10 G |
| B | 1.09 Y | 0.43 Y |
| DE CMC | 1.41 | 0.63 |

(1) Water resistance by this method is done by subjecting a paint film which has been dried at ambient temperature for 24 hours to water droplets on the surface of the paint. The time taken for blistering or softening of the paint in contact with the water droplet is recorded. The longer the time the better the water resistance. The test is stopped after 10 minutes.

(2) Wet abrasion resistance is done by the attached method. The higher the number of cycles, the better the wet abrasion resistance.

(3) Colour is measured on a colour computer and compared to the paint containing vesiculated particles from example 1.

The L value if positive indicates lightness difference and if negative the darkness difference. Paint B is slightly darker than Paint A.

The A value if positive indicates redness difference and if negative, the greenness difference. Paint B is very slightly greener than Paint A.

The B value if positive indicates the yellowness difference and if negative, the blueness difference. Paint B is less yellow than Paint A and thus whiter.

The DE CMC is the overall difference in colour. Paint B has less overall colour change than Paint A.

Example 16

Vesiculated particles (i.e. Example 1 and Example 4) were formulated into the following waterbased paints:
Medium quality interior/exterior paint.
High quality interior matt paint
Effects paint
The properties of the paints were evaluated.
Listed below are the paint formulations and the test results:

Example 17

Vesiculated particles were synthesized as per Example 1 and Example 4.

The vesiculated particles were applied to a black and white opacity chart by means of a 200 mm drawdown bar.

The opacity (i.e. obliterating power) was measured over the black and over the white portions of the opacity chart by means of a reflectometer. The resultant reflectance measurement over the white is divided into the reflectance measurement over the black.

Results as follows:

| | Example 1 | Example 4 |
|---|---|---|
| Opacity | 0.93 | 0.95 |

The higher the figure the greater the obliterating power of the vesiculated bead.

| High Quality Matt Interior/Exterior Paint | | |
|---|---|---|
| | Paint A | Paint B |
| Water | 28.11 | 28.11 |
| Dispersant | 0.24 | 0.24 |
| Titanium Dioxide | 7.90 | 7.90 |
| Calcium Carbonate (2 micron) | 21.82 | 21.82 |
| Calcium Carbonate (5 micron) | 8.11 | 8.11 |
| Propylene Glycol | 1.02 | 1.02 |
| Anionic Surfactant | 0.09 | 0.09 |
| Defoamer | 0.31 | 0.31 |
| Hydroxy Ethyl Cellulose | 0.33 | 0.33 |
| Ammonia | 0.11 | 0.11 |
| Styrene/Acrylic Emulsion (50% solids) | 17.20 | 17.20 |
| Coalescent | 1.66 | 1.66 |
| Bacteriacide | 0.21 | 0.21 |
| Vesiculated Particles (Example 1) | 12.91 | — |
| Vesiculated Particles (Example 2) | — | 12.91 |
| TOTAL | 100.0 | 100.0 |

| RESULTS | | |
|---|---|---|
| | Paint A | Paint B |
| Water resistance | | |
| Water droplet method | 8 | 10 |
| Wet abrasion resistance | >10,000 | >10,000 |
| Opacity | 0.88 | 0.92 |
| Whiteness[1] | 79.57 | 81.06 |

Note:
Paint B is more water resistant, higher opacity and whiter than Paint A.
[1]Whiteness is measured on a colour computer. The higher the figure the whiter the paint.

| High Quality Matt Interior Paint | | |
|---|---|---|
| | Paint A | Paint B |
| 1. Titanium Dioxide dispersion | 21.32 | 21.32 |
| 2. Talc dispersion | 19.07 | 19.07 |
| 3. Thickener | 0.29 | 0.29 |
| 4. Water | 2.02 | 2.02 |
| 5. Ammonia | 0.24 | 0.24 |
| 6. Propylene Glycol | 0.77 | 0.77 |
| 7. Coalescent | 1.345 | 1.345 |
| 8. Defoamer | 0.25 | 0.25 |
| 9. Dispersant | 0.19 | 0.19 |
| 10. Bacteriacide | 0.10 | 0.10 |
| 11. Pure acrylic Emulsion (48% solids) | 39.55 | 39.55 |
| 12. Thickener (for low shear) | 0.15 | 0.15 |
| 13. Thickener (for high shear) | 0.29 | 0.29 |
| 14. Water | 2.95 | 2.95 |
| 15. Vesiculated particles[1] | 11.51 | — |
| 16. Vesiculated particles[2] | — | 11.51 |
| TOTAL | 100.0 | 100.0 |

-continued

RESULTS

|  | Paint A | Paint B |
|---|---|---|
| Water resistance | | |
| Water droplet method | 8 | 10 |
| Wet abrasion resistance | >10,000 | >10,000 |
| Opacity | 92.8 | 95.1 |
| Whiteness | 78.23 | 82.14 |

Note:
Paint B is more water resistant, higher opacity and whiter than Paint A.
[1]Vesiculated particles were manufactured to the particle size as per Example 1 and at 25 micron average particle size by adjusting the rate of agitation
[2]Vesiculated particles were manufactured to the particle size as per Example 4 and at 25 micron average particle size

Effects Paint

|  | Parts by Weight | |
|---|---|---|
|  | Paint A | Paint B |
| 1. Water | 6.07 | 6.07 |
| 2. Propylene Glycol | 1.79 | 1.79 |
| 3. Dispersant | 0.11 | 0.11 |
| 4. Surfactant | 0.18 | 0.18 |
| 5. Defoamer | 0.09 | 0.09 |
| 6. Bacteriacide | 0.05 | 0.05 |
| 7. Ammonia | 0.10 | 0.10 |
| 8. Hydroxy Ethyl Cellulose | 0.05 | 0.05 |
| 9. Pure Acrylic Emulsion (48% solids) | 47.04 | 47.04 |
| 10. Coalescent | 2.09 | 2.09 |
| 11. Vesiculated particles[1] | 39.16 | — |
| 12. Vesiculated particles[2] | — | 39.16 |
| 13. Thickener | 1.23 | 1.23 |
| 14. Water | 0.82 | 0.82 |
| 15. Colour tinter(s) | 1.22 | 1.22 |
| TOTAL | 100.0 | 100.0 |

RESULTS

|  | Paint A | Paint B |
|---|---|---|
| Suede Effect[3] | No | Yes |

[1]Vesiculated particles were manufactured to the particle size as per Example 1 and at 25 micron average particle size by adjusting the rate of agitation
[2]Vesiculated particles were manufactured to the particle size as per Example 4 and at 25 micron average particle size
[3]The Suede Effect is an effect imparted to a paint to give a colour texture effect.

Paint B has superior Suede Effect than Paint A as vesiculated bead is more prominent on the surface due to low water absorption.

The invention claimed is:

1. Vesiculated polymer particles comprising:
particulate solids having chemical groups associated with the surfaces thereof, wherein,
the chemical groups are hydrophobic in nature and include at least fourteen carbon atoms, and
the chemical groups are long chain aliphatic chemical groups and/or sterically hindered, branched, chained chemical groups.

2. The vesiculated polymer particles according to claim 1, wherein,
the chemical groups include at least one polymerisable carbon-carbon double bond with linear, branched or cyclic moieties having at least fourteen but fewer than twenty five carbon atoms.

3. A raw material composition for manufacture of vesiculated particles according to claim 1, comprising:
a carboxylic acid functional, free-radical polymerisable polyester resin;
a co-reactive diluent monomer; and
a modifying comonomer, the modifying co-monomer including at least one polymerisable carbon-carbon double bond with linear, branched or cyclic moieties having at least fourteen carbon atoms.

4. Vesiculated polymer particles comprising:
the raw material according to claim 3, wherein the modifying comonomer comprises 3 to 20% by mass of the reactive diluent monomer.

5. The vesiculated polymer particles according to claim 4, wherein the modifying comonomer comprises 5 to 9% by mass of the reactive diluent monomer.

6. The raw material according to claim 3, wherein the diluent monomer comprises at least one at least one of ethylenic, acrylic and methacrylic functional monomers.

7. The raw material according to claim 6, wherein the diluent co-monomers comprise at least one of styrene, butyl acrylate, and methyl methacrylate.

8. A method of manufacturing the vesiculated particles according to claim 1 in which control of the particle size is achieved chemically, comprising the steps of:
pre-dispersing pigment particles in a polyester;
dissolving the pre-dispersed pigment-polyester in a suitable mixture of diluent monomer and hydrophobic co-monomer in the presence of a water-soluble base;
forming a stable emulsion of droplets of solution of the pre-dispersed pigment-polyester and monomer (oil phase) in water; and
polymerising the polyester and co-polymerisable monomer thereby producing granules of opaque, cross-linked vesiculated particles as a dispersion in water, the particles including hydrophobic groups associated with their surfaces.

9. A method of manufacturing the vesiculated particles according to claim 1, comprising the steps of:
pre-dispersing pigment particles in a polyester;
dissolving the pre-dispersed pigment-polyester in a suitable monomer in the presence of a water-soluble base;
forming a stable emulsion of droplets of solution of the pre-dispersed pigment-polyester and monomer (oil phase) in water;
adding a hydrophobic monomer; and
polymerising the polyester and co-polymerisable monomer thereby producing granules of opaque, cross-linked vesiculated particles as a dispersion in water, the particles including hydrophobic groups associated with their surfaces.

10. The method according to claim 8, wherein the base comprises a polyamine.

11. The method according to claim 10, wherein the base comprises diethylenetriamine.

12. A raw material composition for manufacture of vesiculated particles according to claim 2, comprising:
a carboxylic acid functional, free-radical polymerisable polyester resin;
a co-reactive diluent monomer; and
a modifying co-monomer, the modifying co-monomer including at least one polymerisable carbon-carbon double bond with linear, branched or cyclic moieties having at least fourteen carbon atoms.

13. The vesiculated particles according to claim 4, wherein the diluent monomer comprises at least one of ethylenic, acrylic and methacrylic functional monomers.

14. The vesiculated polymer particles according to claim 5, wherein the diluent monomer comprises at least one of ethylenic, acrylic and methacrylic functional monomers.

15. A method of manufacturing the vesiculated particles according to claim 2 in which control of the particle size is achieved chemically, comprising the steps of:
pre-dispersing pigment particles in a polyester;
dissolving the pre-dispersed pigment-polyester in a suitable mixture of diluent monomer and hydrophobic co-monomer in the presence of a water-soluble base;
forming a stable emulsion of droplets of solution of the pre-dispersed pigment-polyester and monomer (oil phase) in water; and
polymerising the polyester and co-polymerisable monomer thereby producing granules of opaque, cross-linked vesiculated particles as a dispersion in water, the particles including hydrophobic groups associated with their surfaces.

16. A method of manufacturing vesiculated particles from the raw material according to claim 3 in which control of the particle size is achieved chemically, comprising the steps of:
pre-dispersing pigment particles in a polyester;
dissolving the pre-dispersed pigment-polyester in a suitable mixture of diluent monomer and hydrophobic co-monomer in the presence of a water-soluble base;
forming a stable emulsion of droplets of solution of the pre-dispersed pigment-polyester and monomer (oil phase) in water; and
polymerising the polyester and co-polymerisable monomer thereby producing granules of opaque, cross-linked vesiculated particles as a dispersion in water, the particles including hydrophobic groups associated with their surfaces.

17. A method of manufacturing the vesiculated particles according to claim 2 comprising the steps of:
pre-dispersing pigment particles in a polyester;
dissolving the pre-dispersed pigment-polyester in a suitable monomer in the presence of a water-soluble base;
forming a stable emulsion of droplets of solution of the pre-dispersed pigment-polyester and monomer (oil phase) in water;
adding a hydrophobic monomer; and
polymerising the polyester and co-polymerisable monomer thereby producing granules of opaque, cross-linked vesiculated particles as a dispersion in water, the particles including hydrophobic groups associated with their surfaces.

18. A method of manufacturing the vesiculated particles from the raw material according to claim 3 comprising the steps of:
pre-dispersing pigment particles in a polyester;
dissolving the pre-dispersed pigment-polyester in a suitable monomer in the presence of a water-soluble base;
forming a stable emulsion of droplets of solution of the pre-dispersed pigment-polyester and monomer (oil phase) in water;
adding a hydrophobic monomer; and
polymerising the polyester and co-polymerisable monomer thereby producing granules of opaque, cross-linked vesiculated particles as a dispersion in water, the particles including hydrophobic groups associated with their surfaces.

19. The method according to claim 9, wherein the base comprises a polyamine.

20. The vesiculated polymer particles according to claim 2, wherein the chemical groups are selected from the group consisting of:
Lauryl methacrylate, Acrylated castor oil, Acrylated ricinoleic acid, Methacrylated ricinoleic acid, Soya Bean Oil, Unsaturated fatty acids, Unsaturated fatty alcohols, Oleamide, Triglycerides, Ethylenic unsaturated urethanes, Acrylic unsaturated urethanes, Air drying short oil alkyds, Alkyl and Aryl Esters of maleic anhydride, and combinations thereof.

21. The raw material according to claim 3, wherein the modifying co-monomer is selected from the group consisting of:
Lauryl methacrylate, Acrylated castor oil, Acrylated ricinoleic acid, Methacrylated ricinoleic acid, Soya Bean Oil, Unsaturated fatty acids, Unsaturated fatty alcohols, Oleamide, Triglycerides, Ethylenic unsaturated urethanes, Acrylic unsaturated urethanes, Air drying short oil alkyds, Alkyl and Aryl Esters of maleic anhydride, and combinations thereof.

22. The raw material according to claim 12, wherein the modifying co-monomer is selected from the group consisting of:
Lauryl methacrylate, Acrylated castor oil, Acrylated ricinoleic acid, Methacrylated ricinoleic acid, Soya Bean Oil, Unsaturated fatty acids, Unsaturated fatty alcohols, Oleamide, Triglycerides, Ethylenic unsaturated urethanes, Acrylic unsaturated urethanes, Air drying short oil alkyds, Alkyl and Aryl Esters of maleic anhydride, and combinations thereof.

* * * * *

UNITED STATES PATENT AND TRADEMARK OFFICE
CERTIFICATE OF CORRECTION

PATENT NO. : 7,572,846 B2  Page 1 of 1
APPLICATION NO. : 10/529764
DATED : August 11, 2009
INVENTOR(S) : Engelbrecht et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 949 days.

Signed and Sealed this

Seventh Day of September, 2010

David J. Kappos
*Director of the United States Patent and Trademark Office*